April 17, 1962 H. BRANDLE ET AL 3,030,442

FLAW DETECTION APPARATUS INCLUDING MEANS FOR EMPHASIZING VIDEO SIGNAL INTENSIFYING VARIATIONS

Filed March 2, 1959

INVENTORS

Heinrich Brändle

Rolf Wideröe

BY Peirce, Scheffler & Parker

ATTORNEYS

United States Patent Office 3,030,442

Patented Apr. 17, 1962

3,030,442

FLAW DETECTION APPARATUS INCLUDING MEANS FOR EMPHASIZING VIDEO SIGNAL INTENSIFYING VARIATIONS

Heinrich Brandle, Wettingen, and Rolf Wideröe, Nussbamen, near Baden, Switzerland, assignors to Aktiengesellschaft Brown, Boveri & Cie, Baden, Switzerland, a joint-stock company Filed Mar. 2, 1959, Ser. No. 796,519
Claims priority, application Switzerland Mar. 6, 1958
2 Claims. (Cl. 178—6.8)

The present invention relates generally to flaw detection apparatus of the type in which X-ray images are transmitted to a fluorescent screen for scanning by video signal transmission means, and more particularly to the use in such a system of circuit means for emphasizing the intensity variations in the video signal.

It is well known in the art of testing and inspecting relatively thick metallic objects—such as shafts and rotors for electrical machines, steel ingots, rolling mill material and the like—to utilize penetrating X-rays produced by a betatron, for example. Although the best detectability of defects is customarily achieved by photographic recording of the fluoroscopic images, the time required by such a system is prohibitive when a large number of mass-produced articles are to be tested for material defects. Radiography must then be replaced by visual observation of an image on a fluorescent screen, either directly or by using a televison system which transmits the X-ray picture of the particular part of the object being examined to a suitable place, in particular to a place not endangered by radiation. In the past it has been harder to detect relatively slight defects by visual observation than by radiography.

The present invention relates to measures which improve the detectability of article defects in testing with the use of a television system. The television system contains a transmitter and a receiver, which normally are connected by a cable. The transmitter scans the fluorescent screen image to be transmitted line by line (either directly or after the amplification thereof by an image converter) and produces an electric so-called video signal, whose instantaneous value is characteristic of the brightness of the image element just scanned. The video signal is transmitted directly or by carrier oscillation to the receiver, which from the information received produces on a cathode ray tube a picture corresponding to the fluorescent screen image.

According to the present invention, there is obtained from the video signal an additional signal which contains all those components which characterize the intensity variations to be emphasized, and this signal is added to the original video signal, possibly after amplification, so that the receiver produces a picture in which the intensity variations are emphasized as compared with the original fluorescent screen images on the transmitter.

Accordingly, the arrangement of the invention contains time-function means, e.g. an R-C circuit, whose time constant is on the order of magnitude of those times in which the intensity variations to be emphasized occur. This time-function means is used to obtain the additional signal from the video signal.

The use of an R-C circuit for controlling a video signal is known in itself. This measure has been employed in television receivers to restore the original sharpness of vertical black-white edges which are blurred by the limited band width of the transmission system. It is the function of the known arrangement, therefore, to compensate for a deficiency of the transmission system, while the purpose of the present invention is to emphasize selected information components contained in the video signal.

The various objects and advantages of our invention will become more apparent from a study of the following specification when considered in conjunction with the accompanying drawings in which.

Figure 1:
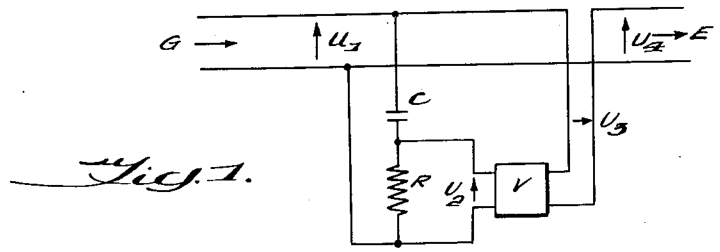
FIG. 1 is a circuit diagram of a simplified embodiment of the auxiliary signal producing means for emphasizing selected information components contained in the video signal.
Figures 3, 4:
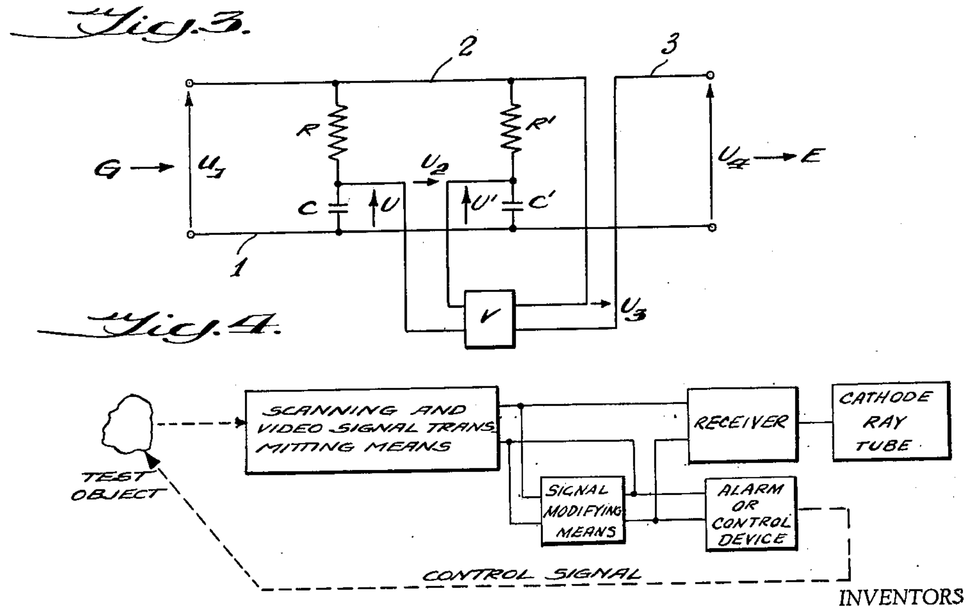
FIG. 4 is a block diagram of the complete object inspecting and testing apparatus.

Referring now more particularly to FIGS. 1 and 4, the video signal, coming from the transmitter G, is designated by $U_1$. The time-function means, which consists of the condenser C and the resistance R, produces from the signal $U_1$ the signal $U_2$ which contains those components of the signal $U_1$ which characterize the intensity variations to be emphasized. For this purpose the R-C time constant should be so proportioned that it is within the order of magnitude of those times in which the intensity variations to be emphasized occur. A time constant suitable for material testing is within the order of magnitude of a few percent of the time required for the transmission of a scanned line. The supplementary signal $U_2$ is amplified by the amplifier V to the signal $U_3$ and is added to the video signal $U_1$, so that the receiver receives the signal $U_4$ (which equals $U_1$ plus $U_3$) and produces an image on the cathode ray tube in which the intensity variations are emphasized as compared with the fluorescent screen image and hence are much more easily detectable.

It has been found in the practice that there often appear sporadically on the picture of the receiver bright dots which are attributable to pulse type interferences contained in the video signal.

Figure 2:
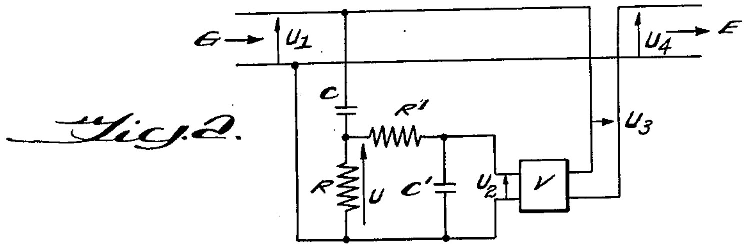
FIGS. 2 and 3 are circuit diagrams of two other embodiments of the auxiliary signal producing means.

These pulses are likewise contained in the signal $U_2$ and get to the receiver with great amplitudes after the amplification. It is desirable, therefore, to reduce the amplitudes of such interference pulses by means of a a second time-function means, e.g. an additional R-C circuit. FIG. 2 shows an arrangement provided with such a second R-C circuit, whose mode of operation is clear by comparing it with FIG. 1. The only added elements are R′ and C′, which form a low-pass filter to reduce the interferences; the R′-C′ time constant is preferably selected small in relation to the R-C time constant.

According to the modification of FIG. 3 the video signal coming from transmitter G is connected to the terminals $U_1$. The R-C and R′-C′ circuits constitute the two time-function means, which produce from the video signal the voltages U, U′. The difference between these two voltages is amplified by amplifier V to form the resultant voltage $U_3$ which, together with the video signal $U_1$, is used for the control of the receiver E connected to the terminals $U_4$. One input terminal of the network is connected to a network output terminal by the conductor means 1, second conductor means 2 connect the other network input terminal to an output terminal of the amplifier V, and third conductor means 3 connect the other output terminal of the amplifier to the other output terminal of the network. One input terminal of amplifier V is connected to the junction point of series-connected resistor R and condenser C, and the other input terminal of amplifier V is connected to the junction point of series-connected resistor R′ and condenser C′.

When the transmission of the fluorescent screen image is accomplished by line-by-line scanning, it is desirable, as has been stated above, to select the time constant of the one integrating member, e.g. the product *R.C*, on the order of magnitude of a few percent of the length of time required for the scanning of a line. The voltage V then reproduces the mean brightness of the fluorescent screen image possibly variable along a line; but it follows with hesitation the deviations of the video signal, limited in time, caused by defects in the object, from its mean value. The other integrating member is so proportioned that the product *R'.C'* is small in relation to the time constant *R.C,* namely with the intention that the voltage U' contains few components caused by interferences superposed on the video signal while yet well following all fluctuations of the video signal caused by defects in the object. The difference $(U'-U)$ thus contains essentially only the signals caused by defects in the object. After amplification, this difference is added as $U_3$ to the video signal $U_0$ and thus emphasizes the variations of the video signal caused by a defect in the object, in that the contrast differences at its two ends are reproduced enlarged as compared with the fluorescent screen image. That is, the beginning and end of the error are indicated particularly clearly.

The significance of the R'-C' circuit with relatively small time constant should be further emphasized. Actually it is possible to effect the intended emphasis of intensity variations caused by defects in the object by the sole use of the R-C circuit, in that the difference $(U_4-U)$ is amplified and added to the video signal. But this difference contains all interferences superposed on the video signal, which after amplification in the amplifier V would get to the receiver with unacceptably large amplitudes. Now these interferences are greatly reduced by the R'-C' circuit acting as a low-pass filter.

Elaborations of the invention are possible, for example, in that the voltage $U_3$ may be utilized to actuate a control or alarm device when it exceeds a certain magnitude (FIG. 4). Such devices can then be used for instance to remove defective articles from a continuously controlled production process.

While in accordance with the patent statutes the best forms and embodiments of the invention have been illustrated and described, it will be apparent to those skilled in the art that other changes and modifications may be made in the apparatus described without deviating from the scope of the invention set forth in the following claims.

We claim:

1. In an object testing and flaw inspecting device having means for examining an object with invisible ray energy and for directing said ray energy upon a fluorescent screen, and television means for line-by-line scanning of said fluorescent screen and for transmitting video signal intelligence therefrom; the improvement which consists of an integrating network having a pair of input terminals to which said video signal intelligence is supplied and a pair of output terminals, an amplifier having input and output terminals, first conductor means connecting one of said network input terminals with one of said network output terminals, second conductor means connecting the other of said network input terminals to one of said amplifier output terminals, third conductor means connecting the other output terminal of said amplifier to said other network output terminal, a first integrating circuit connected across said first and second conductor means and having a time constant which is on the order of magnitude of only a few percent of the time required for the scanning of a picture line, a second integrating circuit connected across said first and second conductor means in parallel with said first integrating circuit and having a time constant which is small relative to the time constant of said first integrating circuit, each of said first and second integrating circuit means including a resistance and a condenser connected in series, and means connecting the input terminals of said amplifier to said first and second integrating circuit means respectively, at the junction points of said series-connected impedances and condensers, said amplifier being operable to algebraically combine the signals from said first and second integrating circuits into a resultant signal and to add said resultant signal to said video signal.

2. Apparatus as defined in claim 1 and further including object-condition indicating means connected to the output terminals of said amplifier and operable when the output voltage of said amplifier exceeds a predetermined magnitude.

UNITED STATES PATENTS

References Cited in the file of this patent

| | | |
|---|---|---|
| 2,550,316 | Wilder | Apr. 24, 1951 |
| 2,561,197 | Goldsmith | July 17, 1951 |
| 2,678,389 | Loughlin | May 11, 1954 |
| 2,717,931 | Duke | Sept. 13, 1955 |